(12) United States Patent
Sim

(10) Patent No.: US 8,059,181 B2
(45) Date of Patent: Nov. 15, 2011

(54) APPARATUS AND METHOD FOR DATA TRANSMISSION/RECEPTION

(75) Inventor: Dae-Hyun Sim, Seoul (KR)

(73) Assignee: Samsung Electronics Co., Ltd (KR)

( * ) Notice: Subject to any disclaimer, the term of this patent is extended or adjusted under 35 U.S.C. 154(b) by 840 days.

(21) Appl. No.: 11/840,817

(22) Filed: Aug. 17, 2007

(65) Prior Publication Data

US 2008/0043109 A1 Feb. 21, 2008

(30) Foreign Application Priority Data

Aug. 17, 2006 (KR) .............................. 2006-0077581

(51) Int. Cl.
H04N 5/222 (2006.01)
(52) U.S. Cl. ................................. 348/333.01
(58) Field of Classification Search ............... 348/211.1, 348/273, 333.01, 333.09, 95
See application file for complete search history.

(56) References Cited

U.S. PATENT DOCUMENTS

| | | | |
|---|---|---|---|
| 7,218,751 B2* | 5/2007 | Reed et al. | 382/100 |
| 7,239,351 B2* | 7/2007 | Kunishige et al. | 348/333.09 |
| 7,411,609 B2* | 8/2008 | Brumitt et al. | 348/211.1 |
| 7,427,983 B1* | 9/2008 | Hildebrandt et al. | 345/175 |
| 2006/0197855 A1* | 9/2006 | Chen | 348/266 |

FOREIGN PATENT DOCUMENTS

| | | |
|---|---|---|
| JP | 2004-178187 | 6/2004 |
| JP | 2004-320121 | 11/2004 |
| JP | 2005-182649 | 7/2005 |
| KR | 1020020009379 | 2/2002 |
| KR | 1020050032748 | 4/2005 |
| WO | WO 02/31749 | 4/2002 |

* cited by examiner

Primary Examiner — David Ometz
Assistant Examiner — Akshay Trehan
(74) Attorney, Agent, or Firm — The Farrell Law Firm, P.C.

(57) ABSTRACT

Disclosed is an apparatus and method for data transmission/reception for transmitting/receiving data, which can transmit and receive data by using a transmitter (display device) capable of receiving and displaying digital data, and a receiver capable of receiving digital data by photographing the digital data. The apparatus includes a transmitter for receiving and displaying digital data; and a receiver for photographing and receiving the digital data displayed in the transmitter, and restoring the received digital data, thereby restoring corresponding data information. The method includes receiving and displaying digital data by a transmitter; and photographing and receiving the digital data displayed in the transmitter, and restoring the received digital data and displaying a corresponding data by a receiver.

10 Claims, 4 Drawing Sheets

APPARATUS AND METHOD FOR DATA TRANSMISSION/RECEPTION

PRIORITY

This application claims priority under 35 U.S.C. §119(a) to a Korean Patent Application entitled "Apparatus and Method For Data Transmission/Reception" filed with the Korean Intellectual Property Office on Aug. 17, 2006 and assigned Serial No. 2006-77581, the contents of which are incorporated herein by reference.

BACKGROUND OF THE INVENTION

1. Field of the Invention

The present invention relates generally to an apparatus and method for data transmission/reception, and in particular, to an apparatus and method for transmitting and receiving data using a transmitter (display device) capable of receiving and displaying digital data and a receiver capable of receiving digital data by photographing the digital data.

2. Description of the Related Art

Recently, the portable terminal has been developed to include a high-speed data transmission function as well as a voice communication function. Moreover, most of today's portable terminals also include a camera which is capable of photographing image data. Typically, the cameras added to the portable terminal are digital cameras. However, if, by using the added camera, the portable terminal can receive and process data of a digital signal as well as photographing the image data, it is possible to receive high speed data at a distance within which the camera can take a photograph.

SUMMARY OF THE INVENTION

An aspect of the present invention is to substantially solve the above-mentioned problems occurring in the prior art and to provide at least the advantages described below. Accordingly, the present invention provides an apparatus and method for data transmission/reception, which can transmit and receive data using a transmitter (display device) capable of receiving and displaying digital data and a receiver capable of receiving digital data by photographing the digital data.

According to an aspect of the present invention, there is provided an apparatus for data transmission/reception. The apparatus includes a transmitter for receiving and displaying digital data; and a receiver for photographing and receiving digital data displayed in the transmitter and restoring corresponding data information by restoring the received digital data.

According to another aspect of the present invention, there is provided a method for data transmission/reception. The method includes receiving and displaying digital data by a transmitter; and photographing and receiving the digital data displayed in the transmitter, and restoring the received digital data and displaying corresponding data of the received digital data by a receiver.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE PREFERRED EMBODIMENTS

Figure 1:
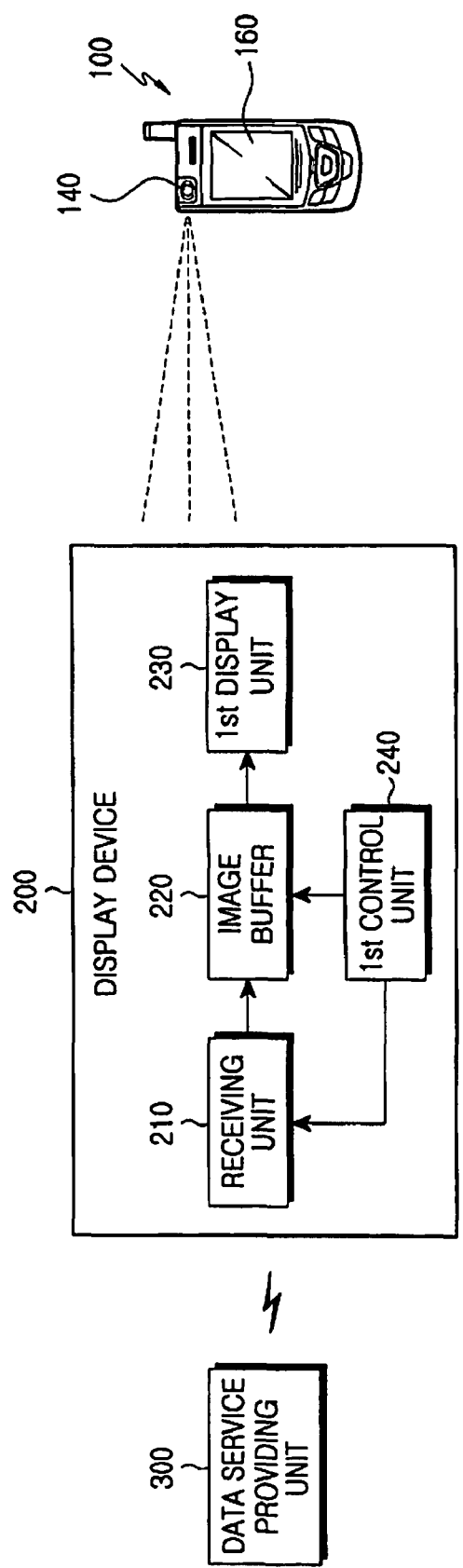
FIG. 1 is a block diagram illustrating data transmission/reception according to the present invention.

Exemplary embodiments of the present invention will be described in detail with reference to the accompanying drawings. Like reference numerals represent like parts throughout the drawings.

FIG. 1 is a block diagram illustrating a data transmission/reception in accordance with an embodiment of the present invention. In an embodiment of the present invention, it is assumed that a transmitter is a display device which can receive and display digital data, and a receiver is a portable terminal which can photograph digital data, thereby receiving the digital data.

In FIG. 1, a data service providing unit 300 transfers data, such as digital broadcast data, news, information of weather forecast and traffic, etc., to a display device 200 in the form of compressed digital data.

The data service providing unit 300 may compress the data using an audio codec such as H.264 and a video codec such as MPEG 4, and transfers the compressed data to the display device 200 in a transfer format in an existing transfer mode of handheld broadcast, such as Real-Time Streaming or File-Delivery, etc.

Further, the data service providing unit 300 transfers the digital data to the display device 200 frame by frame, and each of frames of the digital data transferred frame by frame includes at least one data channel. Each data channel contains corresponding channel information.

Each of the frames contains configuration information for the data channel, namely, frame information which includes values of pixel positions at which corresponding data channels are stored in the entire frame, display information for displaying the frame on the display device 200, frame size information, etc.

The display device 200 displays input digital data. The display device 200 may be installed in an outdoor/indoor space, at home, in the office, in an automobile, etc., and may have resolution capable of resolving the pixel number of a digital camera of Video Graphics Array/Super Video Graphics Array/Extended Graphics Array (VGA/SVGA/XGA) grade, etc.

The display device 200 receives and displays the digital data received frame by frame from the data service providing unit 300. That is, the display device 200 receives and displays a corresponding frame of the digital data including at least one piece of data information.

In the display device 200, a receiving unit 210 receives the corresponding frame of digital data from the data service providing unit 300 over wireless communication frame-by-frame. Here, the received corresponding frame includes the frame information containing at least one data channel, the configuration information for the data channel, display information for displaying the frame on the display device 200, frame size information, etc.

An image buffer 220 stores the received digital data frame-by-frame in which control signal information is contained in a corresponding frame, and outputs the corresponding frame containing the control signal information to a first display unit 230.

The first display unit 230 displays a corresponding frame of the digital data stored in the image buffer 220, which contains control signals. Since the digital data displayed on the first display unit 230 is not normal image data but data for wireless communication, the data is not visible image data which can be recognized by the naked eye.

Figure 2:
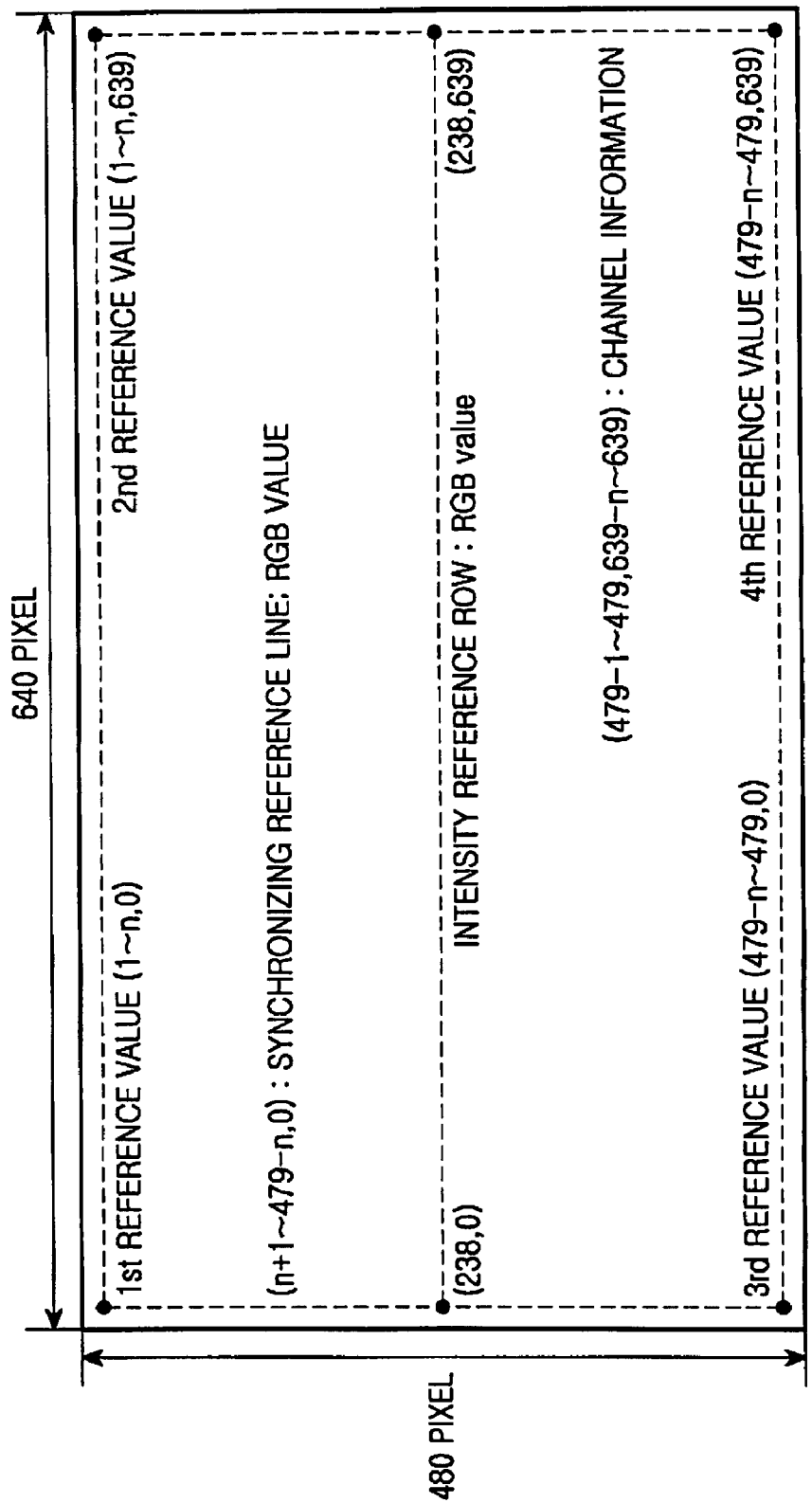
FIG. 2 is a view illustrating a configuration of a corresponding frame of digital data displayed in the transmitter of FIG. 1.

FIG. 2 shows a corresponding frame of digital data stored in the image buffer 220, which contains the control signals such as an intensity calibration signal, a tilt calibration signal, and a synchronizing signal.

In FIG. 2, an intensity reference row corresponds to predetermined positions where pixel data values corresponding to the intensity calibration signal are stored. A first reference value to a fourth reference value correspond to reference values used to extract a degree of tilt of the corresponding frame and to calibrate tilt of the corresponding frame. A synchronizing reference line corresponds to a predetermined position at which the synchronizing signal for indicating a number of the corresponding frame is stored. The channel information indicates a pixel position value at which at least one piece of channel information contained in one frame is stored.

The intensity calibration signal, the tilt calibration signal and the synchronizing signal, which are the control signals of FIG. 2, will be described below in detail for operation of a first control unit 240.

The first control unit 240 controls the general operation of the display unit 200. The first control unit 240 creates the control signal information from the frame information stored in a corresponding frame of the digital data received through the receiving unit 210. Under the control of the first control unit 240, the image buffer 220 stores the digital data frame-by-frame, in which the control signal information is contained in a corresponding frame of the digital data. On the other hand, under the control of the first control unit 240, the first display unit 230 displays a corresponding frame of the digital data stored in the image buffer 220, which contains the control signal information. At this time, under the control of the first control unit 240, the first display unit 230 displays the corresponding frame based on the display information of the frame information stored in the corresponding frame. The display information includes data information (e.g., RGB/YUV) for displaying the corresponding frame on the first display unit 230, horizontal/vertical sync information and pixel clock information.

The first control unit 240 creates the control signal information including the intensity calibration signal, the tilt calibration signal and the synchronizing signal, from the frame information stored in the corresponding frame. FIG. 2 shows the configuration for the corresponding frame of the digital data displayed on the first display unit 230. In FIG. 2, the intensity calibration signal, the tilt calibration signal and the synchronizing signal will be now described.

The intensity calibration signal, which is used to calibrate the intensity of pixel data of the corresponding frame of the digital data photographed by the portable terminal 100, is stored with the same predetermined pixel values at predetermined positions of the corresponding frame.

For example, as shown in FIG. 2, if the size of the corresponding frame is 640*480, a middle pixel row between (238, 0) and (238, 639) is referred to as the intensity reference row (predetermined positions) for storing the intensity calibration signal, and the predetermined pixel values which are middle values of each of RGB are equally stored at the predetermined positions as pixel data values of the intensity calibration signal.

Accordingly, when the portable terminal 100 receives the corresponding frame, actual values of pixel data located in (238, 0)-(238, 639), which are the predetermined positions at which the intensity calibration signal is stored, are compared with the values of the pixel data corresponding to the intensity calibration signal. If the values are different from each other, an error has occurred in the entire pixel data of the corresponding frame. Then, an intensity calibration of the entire pixel data is carried out. The intensity calibration may be performed in a manner where extracted values, which are obtained by dividing the pixel data values of the intensity calibration signal by the actual pixel data values, are added pixel data values located in the corresponding row, respectively.

The tilt calibration signal is used to calibrate the tilt of the photographed corresponding frame when the portable terminal 100 is tilted out of level or is blurred during photographing the digital data displayed in the display device 200.

The tilt calibration signal has at least one reference value. When the size of the corresponding frame is out of the reference value, the corresponding frame is determined as being tilted, and tilt information of the corresponding frame is extracted, by which the tilt of the frame is then calibrated.

For example, as shown in FIG. 2, if the size of the corresponding frame is 640*480, the tilt calibration signal may have at least one reference value of a first reference value (1~n, 0), a second reference value (1~n, 639), a third reference value (479-n~479, 0) and a fourth reference value (479-n~479, 639). In a case in which the tilt calibration signal has the first-fourth reference values, if the corresponding frame is out of positions corresponding to the reference values, the corresponding frame is determined as being tilted. The degree of tilt of the corresponding frame is then extracted. The corresponding pixel values located at positions corresponding to the degree of the tilt are used to calibrate the degree of the tilt. The frame with pixel values of the calibrated positions is then output and displayed again.

The synchronizing signal indicates the number of the corresponding frame of the digital data photographed by the portable terminal 100. The synchronizing signal is stored, as shown FIG. 2, at (n+1~479-n,0) which are predetermined positions of the corresponding frame with predetermined pixel values.

The portable terminal 100 receives digital data displayed in the display device 200 by photographing it, and restores the received digital data and displays corresponding data information. A configuration of the portable terminal 100 will be described in detail with reference to FIG.3.

Figure 3:
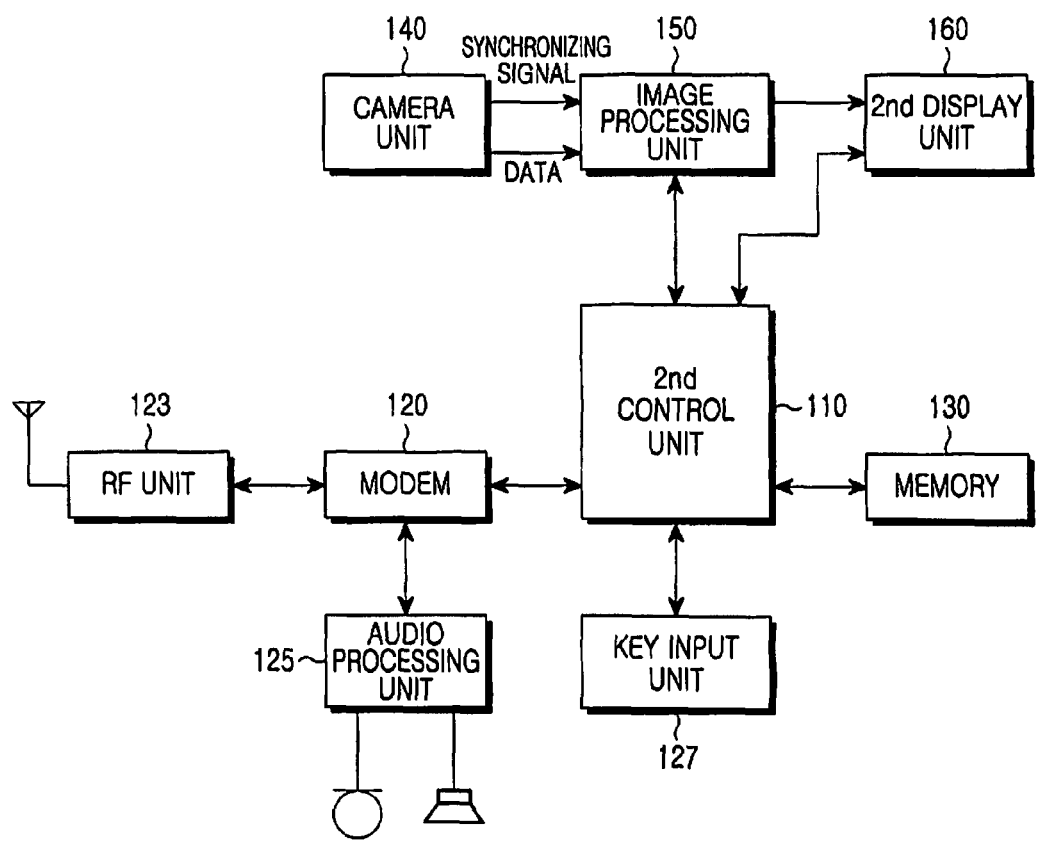
FIG. 3 is a block diagram illustrating a structure of the receiver of FIG. 1.

FIG. 3 shows the configuration of the portable terminal 100 according to an embodiment of the present invention.

In FIG. 3, an Radio Frequency (RF) unit 123 performs wireless communication. The RF unit 123 includes a RF transmitter for up-converting and amplifying the frequency of a signal to be transmitted, and an RF receiver for low-noise amplifying and down-converting the frequency of a signal to be received. A modem 120 includes a transmitter for encoding and modulating the signal to be transmitted and a receiver for demodulating and decoding the signal to be received.

An audio processing unit 125 may constitute a codec, and the codec includes a data codec for processing packet data, etc., and an audio codec for processing audio signals, such as speech, etc. The audio processing unit 125 converts a digital audio signal received in the modem 120 into an analog signal through the audio codec and plays it back, or converts an analog signal, which is generated by a microphone and is to be transmitted, into a digital audio signal through the audio codec, and then transmit it to the modem 120. The codec may be either separately arranged or included in the second control unit 110.

A memory 130 may include a program memory, a data memory, etc. The program memory may store programs for controlling normal operations of the portable terminal and programs for controlling operations according to the present invention in which the digital data received from the camera is restored and the corresponding data information is displayed. Also, the data memory temporarily stores data generated during execution of the programs.

The second control unit 110 controls the general operation of the portable terminal. The second control unit 110 may also include the modem 120 and the codec. The second control unit 110 also extracts the control signal information stored in the corresponding frame of the digital data which is received by photographing by a camera unit 140 according to an embodiment of the present invention, and calibrates the corresponding frame using the control signal information.

The control signal information includes the intensity calibration signal, the tilt calibration signal and the synchronizing signal. The second control unit 110 controls the intensity calibration through the intensity calibration signal, in which when the pixel data values of the corresponding frame are different from that of the pixel data of the intensity calibration signal, the intensity of the corresponding frame is calibrated into predetermined values. Furthermore, the second control unit 110 controls the tilt calibration through the tilt calibration signal of the control signal information, in which when the size of the corresponding frame is out of the at least one reference value of the tilt calibration signal, the second control unit 110 extracts the degree of the tilt of the corresponding frame and calibrates the tilt of the corresponding frame. The second control unit 110 also extracts the number of the corresponding frame through the synchronizing signal of the control signal information.

The second control unit 110 controls the restoration of the calibrated corresponding frame and the display of corresponding data information of the restored frame on the display unit 160.

The second control unit 110 controls the intensity calibration of pixel data of the corresponding frame of the digital data photographed by the camera unit 140. The second control unit 110 controls the extraction of the degree of the tilt of the corresponding frame of the digital data photographed by the camera unit 140 and the calibration of the tilt of the corresponding frame through the tilt calibration signal. The second control unit 110 controls the extraction of the number of the corresponding frame of the digital data photographed by the camera unit 140 through the synchronizing signal.

Moreover, the second control unit 110 controls the restoration of the corresponding frame according to an embodiment of the present invention, and controls the display of the corresponding data information of the corresponding frame, that is, at least one data channel information for the corresponding frame.

The camera unit 140 includes a camera sensor for photographing the image data and converting a photographed optical signal into an electric signal and a signal processing unit for converting an analog image signal photographed by the camera sensor into digital data. Here, the camera sensor is assumed to be a Charge Coupled Device (CCD) sensor, and the signal processing unit may be implemented by a Digital Signal Processor (DSP). Furthermore, the camera sensor and the signal processing unit may be implemented by either a single unit or separated units.

The camera unit 140 receives the data of digital signal in accordance with an embodiment of the present invention, and transfers the received data of digital signal to an image processing unit 150.

The image processing unit 150 generates screen data for displaying the image signal output from the camera unit 140. The image processing unit 150 processes an image signal output from the camera unit 140 frame-by-frame, and outputs the frame image data with the feature and size appropriate to the second display unit 160. The image processing unit 150 also includes an image codec, and compresses the frame image data displayed on the second display unit 160 in a preset mode, or restores the compressed frame image data into original frame image data. Here, the image codec may be a JPEG codec, a MPEG4 codec, a Wavelet codec, etc. The image processing unit 150 is assumed to include an On-Screen Display (OSD) function, and then may output on-screen display data based on a screen size to be displayed under the control of the second control unit 110.

In addition, the image processing unit 150 restores the corresponding frame of the digital data received by photographing by the camera unit 140 in accordance with the present invention into original corresponding data, and outputs the restored corresponding data information to the second display unit 160.

The second display unit 160 displays the image signal output from the image processing unit 150 on the screen, and displays user data output from the second control unit 110. Here, a Liquid Crystal Display (LCD) may be applied to the second display unit 160; in this case, the second display unit 160 may include a LCD controller, a memory capable storing image data, a LCD display element, etc. In a case where the LCD is of a touch screen type, the LCD may be an input unit as well. The second display unit 160 also displays the corresponding data information which is input from the image processing unit 150 according to an embodiment of the present invention, namely, at least one piece of data channel information included in the corresponding frame.

A key input unit 127 includes keys for input of numeral and character information, and function keys for setting various functions.

Data transmitting/receiving operations of the aforementioned data transmission/reception apparatus is described below with reference to FIG. 4.

Figure 4:
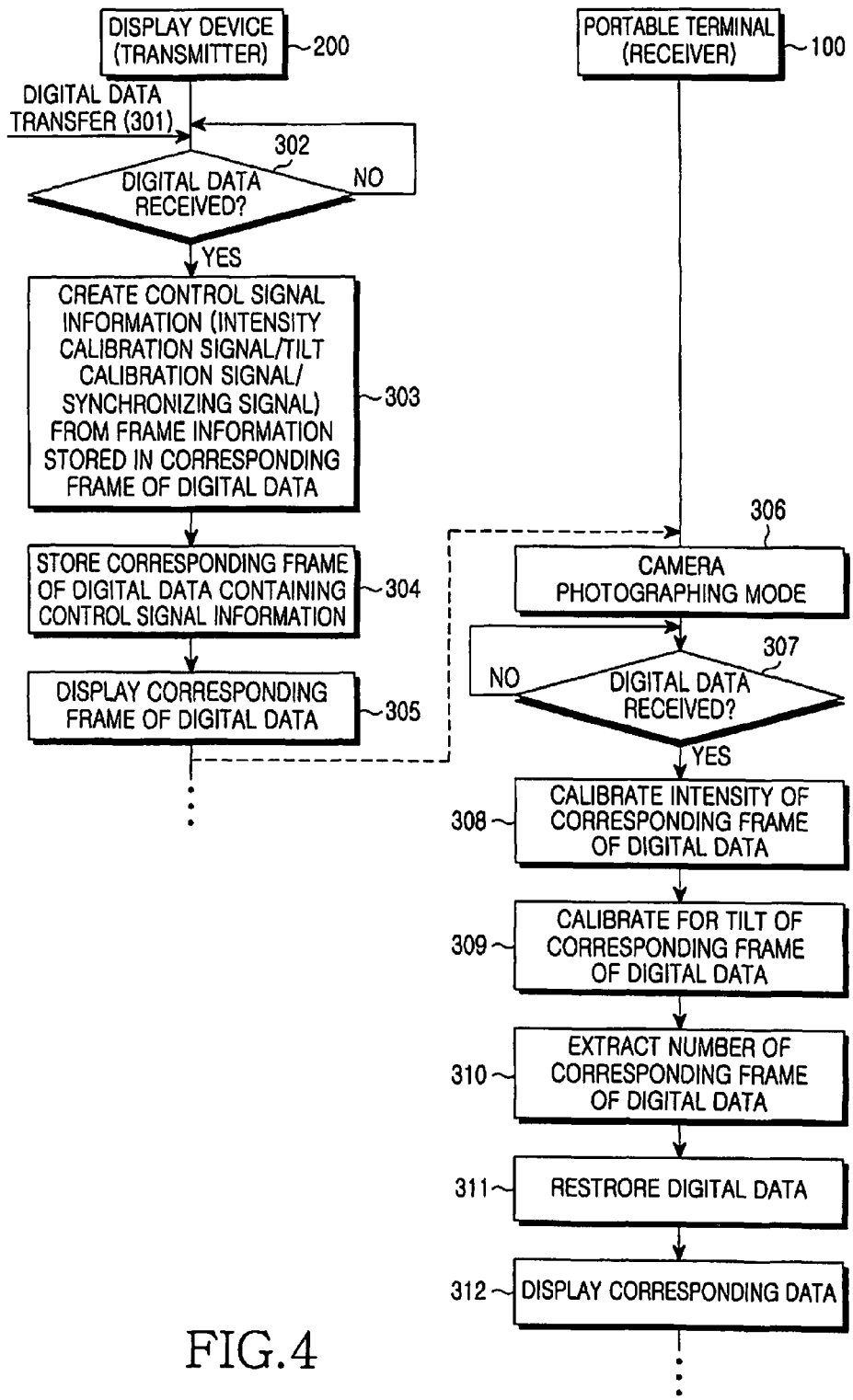
FIG. 4 is a flowchart illustrating a process for data transmission/reception according to the present invention.

In FIG. 4 together with FIGS. 1 to 3, an embodiment of the present invention will be described below.

In FIG. 4, in step 301, the data service providing unit transfers the digital data, of which each frame includes at least one data channel, to the display device 200, and then in step 302, the first control unit 240 in the display device, detects it and causes the receiver to receive the corresponding frame of the digital data. The first control unit 240 creates the control signal information, which includes the intensity calibration signal, the tilt calibration signal and the synchronizing signal, from the frame information stored in the corresponding frame of the digital data in step 303. In step 304, the first control unit 240 causes the digital data to be stored in the image buffer 220 frame by frame, and makes the control signal information to be contained in the corresponding frame of the digital data. And, the first control unit 240 causes the first display unit 230 to display the corresponding frame of the digital data, which contains the control signal information and is stored in the image buffer 220, based on the display information stored in the frame information in step 305.

While the display device 200 displays the corresponding frame of the digital data on the first display unit 230, the receiver 100 receives, in step 306 of a camera photographing mode, the corresponding frame of the digital data by the camera unit 140, and then the second control unit 110 in the portable terminal detects it in step 307 and performs steps 308 to 310, in which the calibrations of the corresponding frame of the digital data are carried out.

The second control unit 110 extracts the control signal information contained the corresponding frame of the digital data, and calibrates the corresponding frame of the digital data through the control signal information including the intensity calibration signal, the tilt calibration signal and the synchronizing signal.

In step 308, the second control unit 110 first performs the intensity calibration of the corresponding frame of the digital data. The second control unit 110 compares the pixel data values of the intensity calibration signal with the actual pixel data values stored at the predetermined positions at which the intensity calibration signal is stored in the step 308. When the actual pixel data values are different from the pixel data values of the intensity calibration signal, the second control unit 110 calibrates the pixel data of the corresponding frame into the predetermined values.

After the intensity calibration, the second control unit 110 performs the tilt calibration of the corresponding frame of the digital data in step 309. In step 309, the second control unit 110 determines whether the size of the corresponding frame is out of at least one reference value of the tilt calibration signal, that is, at least one reference value configured according to the size of the corresponding frame. If the corresponding frame is out of the at least one reference value, the second control unit 110 detects it and determines that tilt has occurred in the photographed corresponding frame. The second control unit 110 then extracts the degree of the tilt of the corresponding frame through the at least one reference value and calibrates it.

Furthermore, the second control unit 110 extracts the number of the corresponding frame of the digital data through the synchronizing signal in step 310.

The second control unit 110 detects when the calibrations of step 308 to 310 are finished, and performs step 311, in which the second control unit 110 causes the image processing unit 150 to restore the corresponding frame to have original data.

The second control unit 10 performs step 312, in which corresponding data information restored in the step 311 is displayed on the display unit 160. In step 312, at least one data channel, which is the corresponding data information, included in the corresponding frame may be displayed on the display unit 160.

When a predetermined data channel is selected from the at least one data channel displayed on the display unit 160, information for the selected data may be displayed, and the selected channel may be displayed to be played-back.

A data transfer rate on the basis of Video Graphics Array (VGA) grade (640*480) from the display device 200 corresponding to the transmitter in the present invention to the portable terminal 100 corresponding to the receiver can be up to "300 kbps (pixel speed)*256 (color-depth)*30 frames=2.3 Gbps". In the case where data compression is with an H.264 codec (384 kbps, QVGA 30 frames), which is currently being used, broadcast contents with 256 Quarter Video Graphics Array (QVGA) grade can be received in a multi-user environment. However, in case of normal data transfer (e.g., web-service, e-mail, streaming, up-link channel separate configuration), data can be transferred at a rate of 2.3 Gbps.

As described above, the present invention transmits and receives data by using the display device capable of receiving and displaying digital data and the portable terminal capable of receiving digital data by photographing digital data. The present invention, therefore, provides the added function of receiving data within a short-range so as to replace existing handheld broadcasting devices. In particular, the present invention also has the added advantage of allowing, for example, a large-sized screen or LCD TV generally found in public places to be used for data communication in a multi-user environment.

While the invention has been shown and described with reference to certain exemplary embodiments such as the portable terminal, it will be understood by those skilled in the art that various changes in form and details may be made therein without departing from the spirit and scope of the invention as defined by the appended claims. The scope of the invention should in no way be limited to the exemplary embodiments, but should be defined by the appended claims along with the full scope of equivalents thereof.

What is claimed is:

1. An apparatus for data transmission/reception, the apparatus comprising:
   a transmitter for receiving and displaying digital data;
   a receiver for photographing and receiving the digital data displayed in the transmitter, and restoring corresponding data information by restoring the received digital data; and
   a data service providing unit for transferring the digital data frame-by-frame to the transmitter,
   wherein each of the frames of the digital data includes at least one data channel, each of the at least one data channel including corresponding channel information,
   wherein the transmitter comprises a control unit for creating control signal information from frame information contained in the corresponding frame of the digital data,
   wherein the control unit creates the control signal information including an intensity calibration signal, a tilt calibration signal, and a synchronizing signal, and stores the control signal information in the corresponding frame at predetermined pixel coordinate positions, respectively, and
   wherein the digital data is calibrated by the receiver using the control signal information.

2. The apparatus of claim 1, wherein the transmitter further comprises:
   a receiving unit for receiving the digital data; and
   an image buffer for storing the digital data frame-by-frame, in which a frame of the digital data includes at least one data channel and control signal information is contained in a corresponding frame of the digital data;
   a display unit for displaying the corresponding frame of the digital data stored in the image buffer,
   wherein the control unit controls storage of the digital data frame-by-frame in the image buffer and controls display of the corresponding frame of the digital data stored in the image buffer on the display unit, each of the frames of the digital data includes at least one data channel frame and containing the control signal information.

3. The apparatus of claim 1,
   wherein the intensity calibration signal is used to calibrate intensity of pixel data of the corresponding frame of the digital data photographed by the receiver, and the tilt calibration signal is used to calibrate tilt of the corresponding frame of the digital data photographed by the receiver, and the synchronizing signal is used to indicate a number of the corresponding frame of the digital data photographed by the receiver.

4. The apparatus of claim 1, wherein the receiver comprises:
  a camera unit for photographing the digital data displayed in the transmitter;
  an image processing unit for restoring a corresponding frame of the digital data photographed by the camera unit and output corresponding data information of the corresponding frame of the digital data into a display unit; and
  a control unit extracting the control signal information contained in the corresponding frame of the digital data when the corresponding frame of the digital data photographed by the camera is received, calibrating the corresponding frame, and controlling restoration of the corresponding frame and display of the corresponding data information of the corresponding frame on the display unit.

5. The apparatus of claim 4, wherein the control unit calibrates pixel data values of the corresponding frame into predetermined values using the intensity signal in the control signal information when the pixel data values of the corresponding frame are different from pixel data values of the intensity calibration signal in the control signal information;
  the control unit extracts a degree of tilt of the corresponding frame and calibrates the tilt of the corresponding frame using the tilt calibration signal in the control signal information when a size of the corresponding frame is out of at least one reference value of the tilt calibration signal; and
  the control unit extracts a number of the corresponding frame using the synchronizing signal in the control signal information.

6. The apparatus of claim 1, wherein the transmitter is a display device capable of displaying the received digital data, and the receiver is a portable terminal including a digital camera unit.

7. A method for data transmission/reception, the method comprising:
  transferring, by a data service providing unit, digital data frame-by-frame to a transmitter;
  receiving and displaying the digital data by the transmitter; and
  photographing and receiving the digital data displayed in the transmitter, and restoring the received digital data and displaying corresponding data of the received digital data by a receiver,
  wherein receiving and displaying the digital data by the transmitter comprises:
    receiving a corresponding frame of the digital data, the corresponding frame including at least one data channel;
    creating control signal information from frame information stored in the corresponding frame of the digital data;
    storing the control signal information in the corresponding frame of the digital data; and
    outputting and displaying the corresponding frame of the digital data containing the control signal information,
  wherein the control signal information includes an intensity calibration signal, which is stored at a first predetermined pixel coordinate position of the corresponding frame, a tilt calibration signal, which is stored at a second predetermined pixel coordinate position of the corresponding frame, and a synchronizing signal, which is stored at a third predetermined pixel coordinate position of the corresponding frame, and
  wherein the digital data is calibrated by the receiver using the control signal information.

8. The method of claim 7, wherein displaying the corresponding data of the received digital data by the receiver further comprises:
  photographing and receiving, by the receiver, the digital data displayed in the transmitter;
  calibrating the corresponding frame of the received digital data using the control signal information; and
  restoring the corresponding frame of the calibrated digital data and displaying corresponding data information of the corresponding frame.

9. The method of claim 8, wherein calibrating the corresponding frame of the received digital data using the control signal information further comprises:
  extracting the control signal information stored in the corresponding frame of the received digital data;
  calibrating pixel data of the corresponding frame into predetermined values using the intensity calibration signal of the control signal information when pixel data values of the corresponding frame are different from pixel data values of the intensity calibration signal;
  extracting a degree of tilt of the corresponding frame and calibrating the tilt of the corresponding frame using the tilt calibration signal of the control signal information when a size of the corresponding frame is out of at least one reference value of the tilt calibration signal; and
  extracting a number of the corresponding frame using the synchronizing signal of the control signal information.

10. The method of claim 7, wherein the transmitter is a display device capable of displaying received digital data, and the receiver is a portable terminal including a digital camera unit.

* * * * *